Patented Aug. 28, 1951

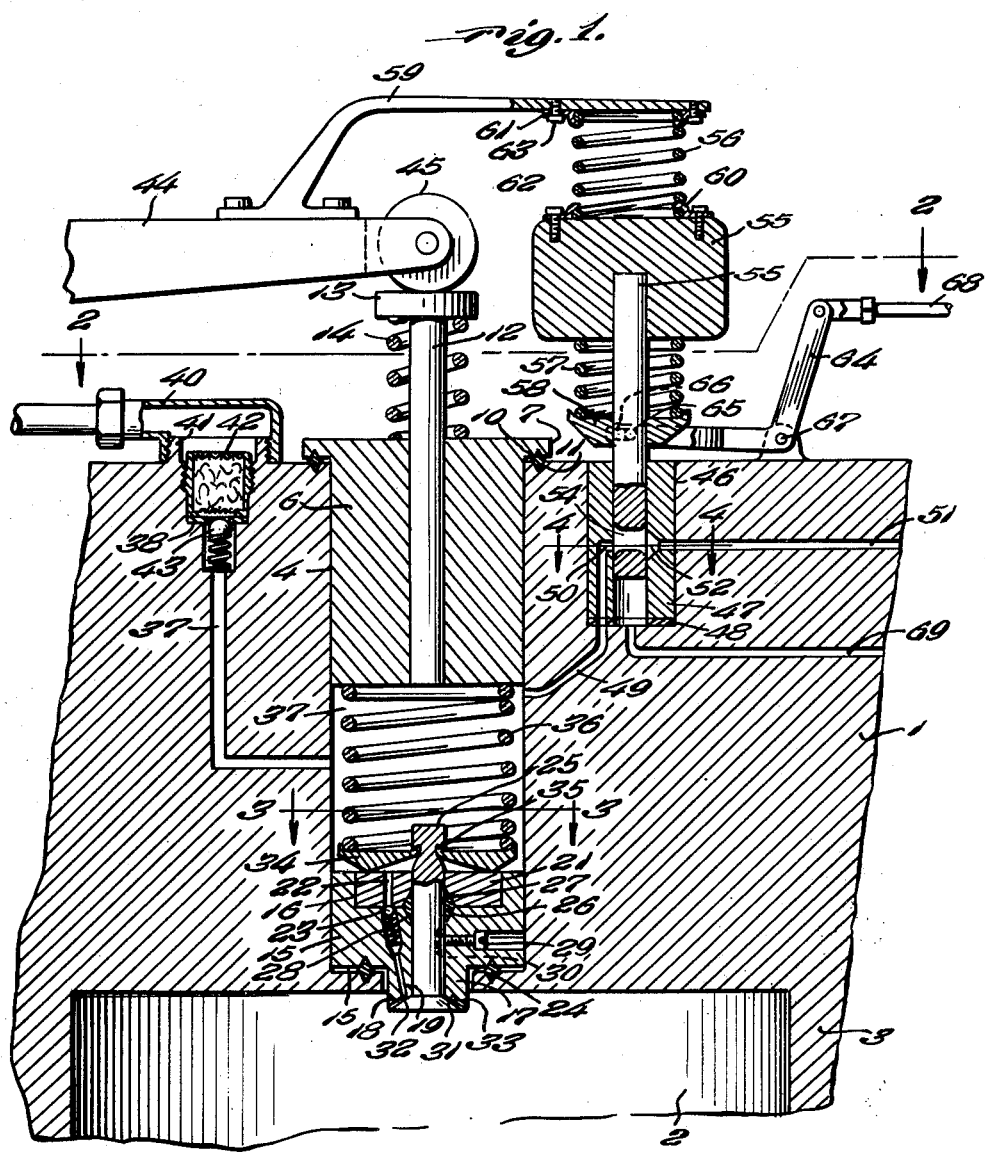

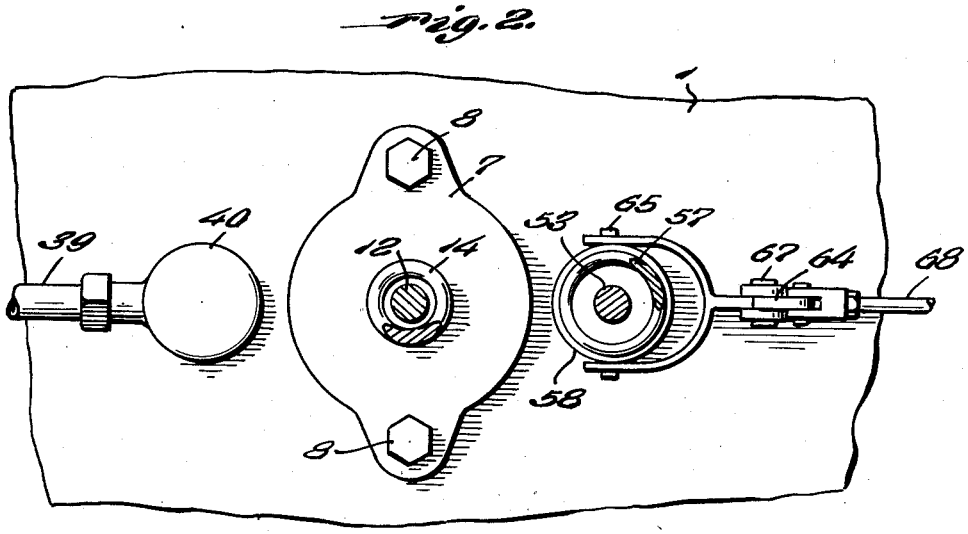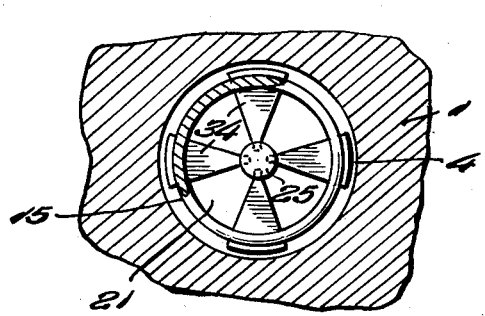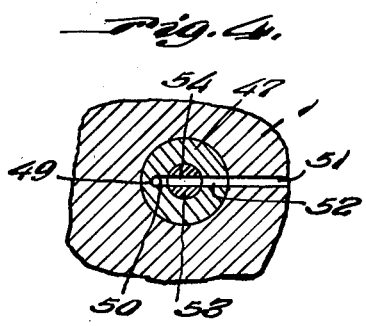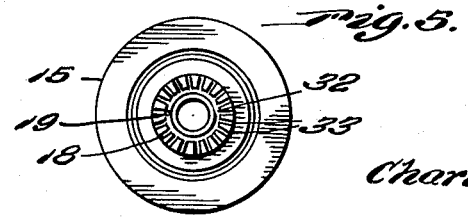

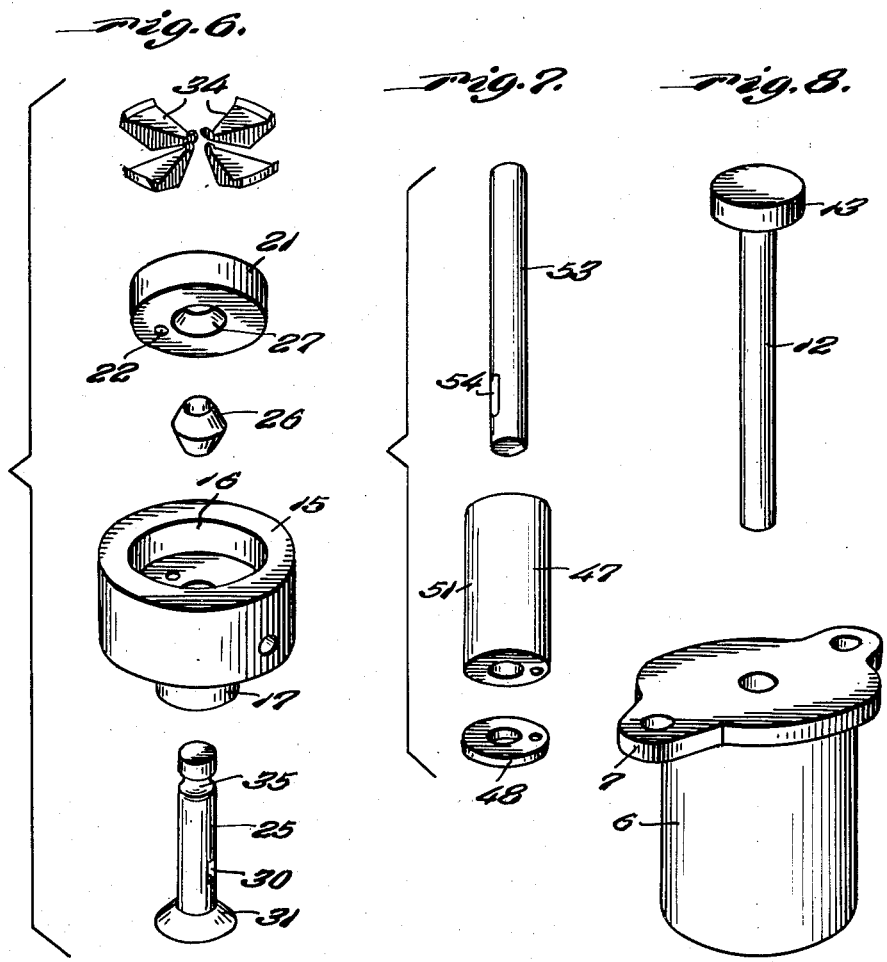

2,565,516

UNITED STATES PATENT OFFICE 2,565,516

GOVERNOR CONTROLLED INJECTION MEANS FOR INTERNAL-COMBUSTION ENGINES

Charles John Patus, South Bend, Ind., assignor of twenty-four per cent to Nandor F. Patus and twenty-four per cent to Alex Patus, Jr., both of South Bend, Ind.

Application August 16, 1946, Serial No. 690,913

6 Claims. (Cl. 103—41)

My invention relates to improvements in governor controlled injection means for internal combustion engines, especially, although not necessarily, of the "Diesel" type.

The primary objects of this invention is to provide for governor control of fluid injection at each unit of an internal combustion engine, of the above designated type especially, in timed relation to rotation of the crank shaft of the engine and through the medium of reciprocating governor devices for each unit equipped for uniform operation, relatively, to control fluid injection so as to maintain a predetermined speed of operation of the engine regardless of variations in load imposed on the engine.

Another object is to provide, in addition to the above, an improved injector spray nozzle especially designed for finely dividing all types of fuel and distributing the same in the combustion chamber of the engine with a high turbulence velocity so as to promote combustion efficiency.

Other and subordinate objects, also comprehended by my invention, together with the precise nature of my inprovements, and the advantages thereof, will be readily understood when the succeeding description and claims are read with reference to the drawings accompanying and forming part of this specification.

In said drawings:

Figure 1 is a fragmentary view in vertical section illustrating my invention in a preferred embodiment thereof, Figure 2 is a fragmentary view in plan, Figure 3 is a fragmentary view in horizontal section taken on the line 3—3 of Figure 1, Figure 4 is a similar view taken on a line 4—4 of Figure 1, Figure 5 is a view in bottom plan of the body of the injector spray nozzle, Figure 6 is a disassembled view of the parts of the injector spray nozzle shown in perspective, Figure 7 is a similar view of parts of the governor, Figure 8 is a view in perspective of the plunger, Figure 9 is a similar view of the bushing for the plunger, Figure 10 is a similar view of the seat member forming a part of the governor.

Referring to the drawings by numerals, my improvements have been shown therein as embodied in a single, internal combustion engine unit, of a "Diesel" engine, illustrated conventionally, as sufficient for the present purpose, the numeral 1 designating a cylinder block and 2 the combustion chamber of one cylinder 3.

According to my invention, a vertical bore 4 is provided in the block 1 in the top thereof and axially of the combustion chamber 2 and which is provided with an internal, annular, flat seat 5 at the lower end thereof, the bore 4 opening into the top of the combustion chamber 2, as will be understood. A substantially shorter bushing 6, of any suitable metal, is fitted in the upper end of the bore 4 with a circumferential upper end flange 7 thereon, bolted as at 8, to said block 1. A bronze sealing ring 9 is clamped, by the bolts 8, between said flange 7 and said block 1 and in grooves 10, 11 in the flange and block. Thus, a hydrostatic seal is formed at the top of the bore 4, between the bushing 6 and the block 1, for a purpose presently seen.

A rod-like plunger 12 is slidably extended downwardly through the bushing 6 with a head 13 thereon disposed well above said bushing.

A coil spring 14 surrounding said plunger 12 between said head 13 and the bushing 6 tensions the plunger 12 against downward movement.

An injector spray nozzle unit is provided in the lower end of the bore 4, the basic element of which is a cylindrical, axially bored, body 15, of any suitable metal, having a slip fit in the bore 4 and provided with an upper end, concentric, recess 16, a lower end neck 17 extending for a short distance into the combustion chamber 2, and an internally bevelled end seat 18 in said neck, for a purpose presently apparent. A fuel discharge duct 19 extends obliquely from the bottom of the recess 16 to the seat 18 and is provided with an enlarged upper end 20. A steel washer 21 is fitted in the recess 16 with a transverse port 22 therein opening into the duct 19. A spring pressed ball 23 in the end 20 of the duct 19 yieldingly closes the lower end of the port 22. A bronze sealing ring 24 is interposed between the bottom of the body 15 and the seat 5 and is countersunk in both to form a seal between the bore 4 and the combustion chamber 2.

A cylindrical core 25, of suitable metal, is slidably fitted in the bore of the body 15 and in the steel washer 21 to extend above the washer for a short distance. A double coned bronze ferrule 26 surrounds the core 25 and is interposed between the steel washer 16 and the body 15 with a wedge fit in tapered sockets 27, 28 formed in said washer and body. A machine screw 29 extended radially into the body 15 into a slot 30 in the core 25 prevents said core from falling through said body into the combustion chamber 2.

A frusto-conical flange 31 on the lower end of the plunger 25 complements and fits against the seat 18 to close at one side thereof an annular fine gauge groove 32 in the seat, into which the lower end of the duct 19 opens, and which intersects a plurality of fine gauge grooves 33 in said seat radiating from the groove 32.

On top of the steel washer 21 is a plurality of core lifters 34 in the form of elongated, triangular, rockers disposed radially around the core 25 to fulcrum intermediate their ends on said washer 21 with inner ends pivoting in a circumferential groove 35 in the core 25. A coil spring 36 in the bore 4 seating on the outer ends of the lifters 34 and interposed between the same and the bushing 6 tends to rock said lifters upwardly at their inner ends.

The portion of the bore 4 intermediate the bushing 6 and the described injector spray nozzle unit forms a compression reservoir 37 for the fluid fuel. As will be seen, under compression of the spring 36 against the lifters 34, said lifters force the steel washer 21 down against the body 15 and said body toward the sealing ring 24 thus tightening the seal between said body 15 and the seat 5 and compressing the ferrule 26 in the seats 27, 28 so that a compression leak proof seal is maintained between the compression chamber 2 and the injector spray nozzle unit including a seal between the bore of the body 15 and the fuel compression reservoir 37, as well as between said bore and the core 25. Under lift imparted to the core 25, the flange 31 is held tight against the seat 18, thereby forming a compression leak proof seal between the compression chamber 2 and the bore of the body 15.

A right angled fuel inlet duct 38 extends downwardly through the block 1 at one side of the bore 4 and then laterally into the compression reservoir 37 with an upper stepped, enlarged, end 38. A fuel supply line 39 is provided for conveying fluid fuel, under pressure from a suitable source, not shown, to the upper end 38 of said supply duct 37. The line 39, as shown, is provided with a coupling 40 threaded onto a nipple 41 on the block 1. A suitable filter 42 is provided in the upper end 38 of the fuel supply duct 37, and a downwardly opening, spring loaded, back pressure ball check 43 in said upper end 38 and below the filter 42.

A rocker arm 44 with a roller 45 thereon for engaging the head 13 of the plunger 12 is provided for depressing said plunger 12 into the compression reservoir 37 to compress the fuel in said reservoir. The rocker 44 is designed to be operated to depress said plunger 12 once during each revolution of the crank shaft of the engine, and through any suitable means such as a cam shaft. However, it has not been deemed necessary to a proper understanding of the invention to illustrate the rocker arm operating parts.

In addition to the foregoing, my invention comprises a governor which will now be described in detail. On one side of the bore 4 and above the compression reservoir 37 a cylindrical socket 46 is formed in the top of the block 1 in which is fitted a tubular bushing 47 seating on a bronze washer 48. A pressure relief duct 49 extends laterally and upwardly from the upper end of the compression reservoir 37 through the block 1 and through the washer 48 and the bushing 47 at one side of the axis of said washer and bushing, said duct 49 having an upper end 50 opening laterally into the interior of the bushing 47 substantially midway of the ends of said bushing. A horizontal duct 51 extends radially through said bushing 47 diametrically opposite the end 50 of the duct 49, and then out of the block 1, and which is formed with a flaring inner end 52. A vertically reciprocating stem 53 is provided in the bushing 47, with a working fit therein, and which extends above the same with a longitudinal slot 54 in the lower end thereof adapted to be moved into and out of registration with the inner ends 50, 52 of the ducts 49, 51, by reciprocation of said stem.

A weight 55 is suitably fixed on the upper end of the stem 53. The weight 55 is interposed between a pair of upper and lower coil springs 56, 57, the lower one of which is seated on an annular member 58 vertically slidable on the stem 53, the upper spring 56 being interposed between said weight and an extension 59 of the rocker arm 44. The upper spring 56 is suitably fixed to said weight 55 and extension 59 by keepers, as at 60, 61, bolted as at 62, 63 to said weight and extension.

A forked bell crank lever 65 straddles the member 58 and is pivotally and slidably connected thereto by a pin and slot connection 65, 66, said lever being pivoted as at 67, on the block 1 for operation by a control rod 68 for vertical swinging movement to raise and lower the member 58. The control rod 68 is designed to be set in different endwise positions by any suitable means.

A back pressure duct 69 extends from the bottom of the socket 46 laterally out of the block 1 to release air pressure below the stem 53, for a purpose which will be apparent. The duct 51 is designed to be connected in any desired manner, not shown, back to the source of fluid fuel supply.

Referring now to the operation of the described invention. In starting, the bell crank lever 64 is swung in the proper direction by the control rod 68 to lift the member 58 and thereby compress the springs 56, 57 so as to lift the weight 55 and the stem 53 until the slot 54 is above the ends 50, 52 of the ducts 49, 51. A compression bleed line comprising the ducts 49, 51, and the slot 54 is thereby closed. Therefore, upon downward rocking of the rocker arm 44, the fluid fuel in the compression reservoir 37 is compressed by downward movement of the plunger 12 in opposition to the spring 14, and the fluid under compression discharges through the port 22, duct 19, past valve 23, into the annular groove 32 to issue from the grooves 33 in downwardly and outwardly directed finely divided jet form. At each downward stroke of the rocker 44, the springs 56, 57 are additionally compressed between the extension 59 and the weight 55, on the one hand, and between the weight 55 and the member 58, on the other hand, to cause the stem 53 to vibrate vertically. Obviously, the lever 64 and the member 58 may be set to vary the tension on the springs 56, 57 so that the stem 53 will vibrate and consequently vibrate the slot 54 so as to register the slot with the ends 50, 52 of the ducts 49, 51 and thereby open the described pressure bleed line in different degree at different selected speeds of the engine, whereby the pressure in the compression reservoir 37 will be intermittently bled to throttle the engine down and thereby cause the same to maintain a selected speed of operation. When the engine speeds up, due to lightening of the load thereon, the vibratory stroke of the stem 53 increases and the bleed line described is opened up quickly causing reduction in the amount of fuel injected so that the engine slows down to its predetermined or preselected speed. When the load on the engine increases, the vibratory stroke of the stem 53 becomes shorter thus causing increased injection to speed up the engine. When the lever 64 and member 58 are set so that the slot 54 will completely open the described compression bleed line, no injection takes place even through the engine is running under momentum.

The foregoing will, it is believed, suffice to impart a clear understanding of my invention, without further explanation.

Manifestly, the invention as described, is susceptible of modification without departing from the inventive concept, and right is herein reserved to such modifications as fall within the scope of the appended claims.

What I claim is:

1. In a fuel injection pump for an internal combustion engine, a fluid fuel reservoir, a spray nozzle injector unit for injecting the fuel out of the reservoir, means to convey fluid fuel from a source under pressure to said reservoir, means operative to compress the fuel in said reservoir to force the same out of said injector including a rocker, and means rendered effective by operation of said rocker to variably bleed compression in said reservoir in accordance with the speed of operation of the rocker.

2. In a fuel injection pump for an internal combustion engine, a fluid fuel reservoir, a spray nozzle injector unit for injecting the fuel out of said reservoir, means to convey fluid fuel from a source under pressure to said reservoir, means operative to compress the fuel in said reservoir to force the same out of said injector including a rocker, and means rendered effective by operation of said rocker to variably bleed compression in said reservoir in accordance with the speed of operation of the rocker including a bleed line duct extending from said reservoir, and a vibratory device for intermittently opening and closing said duct.

3. In a fuel injection pump for an internal combustion engine, a fluid fuel reservoir, a spray nozzle injector unit for injecting the fuel out of said reservoir, means to convey fluid fuel from a source under pressure to said reservoir, means operative to compress the fuel in said reservoir to force the same out of said injector including a rocker, and means rendered effective by operation of said rocker to variably bleed compression in said reservoir in accordance with the speed of operation of the rocker including a bleed line duct extending from said reservoir, and a vibratory device for intermittently opening and closing said duct spring suspended from said rocker for vibration thereon.

4. In a fuel injection pump for an internal combustion engine, a fluid fuel reservoir, a spray nozzle injector unit for injecting the fuel out of said reservoir, means to convey fluid fuel from a source under pressure to said reservoir, means operative to compress the fuel in said reservoir to force the same out of said injector including a rocker, and means rendered effective by operation of said rocker to variably bleed compression in said reservoir in accordance with the speed of operation of the rocker including a bleed line duct extending from said reservoir, and a vibratory device for intermittently opening and closing said duct spring suspended from said rocker for vibration thereon and comprising a slotted stem intersecting said duct.

5. In a fuel injection pump for an internal combustion engine, a fluid fuel reservoir, a spray nozzle injector unit for injecting the fuel out of said reservoir, means to convey fluid fuel from a source under pressure to said reservoir, means operative to compress the fuel in said reservoir to force the same out of said injector including a rocker, and means rendered effective by operation of said rocker to variably bleed compression in said reservoir in accordance with the speed of operation of the rocker including a bleed line duct extending from said reservoir, and a vibratory device for intermittently opening and closing said duct spring suspended from said rocker for vibration thereon and comprising a counterweighted stem intersecting said duct and provided with a slot movable under vibration of the stem into intersecting relation to said duct in variable degree.

6. In a fuel injection pump for an internal combustion engine, a fluid fuel reservoir, a spray nozzle injector unit for injecting the fuel out of said reservoir, means to convey fluid fuel from a source under pressure to said reservoir, means operative to compress the fuel in said reservoir to force the same out of said injector including a rocker, and means rendered effective by operation of said rocker to variably bleed compression in said reservoir in accordance with the speed of operation of the rocker including a bleed line duct extending from said reservoir, and a virbratory device for intermittently opening and closing said duct spring suspended from said rocker for vibration thereon and comprising a counterweighted stem intersecting said duct and provided with a slot movable under vibration of the stem into intersecting relation to said duct in variable degree, said stem being settable to move said slot out of intersecting relation, and manual means for setting said stem.

CHARLES JOHN PATUS.

REFERENCES CITED

The following references are of record in the file of this patent:

UNITED STATES PATENTS

| Number | Name | Date |
|---|---|---|
| 654,140 | Diesel | July 24, 1900 |
| 940,703 | McCarty | Nov. 23, 1909 |
| 1,065,971 | Severin | July 1, 1913 |
| 1,216,460 | Kilgore | Feb. 20, 1917 |
| 1,327,744 | Tartrais | Jan. 13, 1920 |
| 1,595,624 | Scott | Aug. 10, 1926 |
| 1,766,389 | Kramling | June 24, 1930 |
| 1,779,374 | Ensign | Oct. 21, 1930 |
| 1,788,288 | Frey | Jan. 6, 1931 |
| 1,801,447 | Muzzy | Apr. 21, 1931 |
| 2,011,166 | Steiner | Aug. 13, 1935 |
| 2,146,139 | Greene | Feb. 7, 1939 |